United States Patent
Muenz

(10) Patent No.: US 7,580,768 B2
(45) Date of Patent: Aug. 25, 2009

(54) METHOD OF ADJUSTING PROCESS VARIABLES IN A PROCESSING FLOW

(75) Inventor: Josef Muenz, Munich (DE)

(73) Assignee: Texas Instruments Deutschland GmbH, Freising (DE)

( * ) Notice: Subject to any disclaimer, the term of this patent is extended or adjusted under 35 U.S.C. 154(b) by 137 days.

(21) Appl. No.: 11/860,212

(22) Filed: Sep. 24, 2007

(65) Prior Publication Data

US 2008/0077256 A1 Mar. 27, 2008

(30) Foreign Application Priority Data

Sep. 22, 2006 (DE) .................. 10 2006 044 898

(51) Int. Cl.
*G06F 19/00* (2006.01)
*G05B 13/00* (2006.01)

(52) U.S. Cl. .................................. 700/109; 700/28

(58) Field of Classification Search ............. 700/28–34, 700/40–45, 47–50, 108–110, 117–121; 702/81–84, 702/182

See application file for complete search history.

(56) References Cited

U.S. PATENT DOCUMENTS

| | | | |
|---|---|---|---|
| 5,408,405 A | 4/1995 | Mozumder et al. | |
| 5,949,678 A * | 9/1999 | Wold et al. | 700/83 |
| 6,549,864 B1 * | 4/2003 | Potyrailo | 702/81 |
| 6,662,061 B1 * | 12/2003 | Brown | 700/97 |
| 6,819,963 B2 * | 11/2004 | Riley et al. | 700/29 |
| 6,912,436 B1 * | 6/2005 | Jones et al. | 700/121 |
| 6,988,017 B2 * | 1/2006 | Pasadyn et al. | 700/121 |
| 7,043,403 B1 * | 5/2006 | Wang et al. | 702/185 |
| 7,082,345 B2 * | 7/2006 | Shanmugasundram et al. | 700/121 |
| 7,174,283 B2 * | 2/2007 | Berkooz et al. | 703/2 |
| 7,200,459 B1 * | 4/2007 | Bode et al. | 700/121 |
| 7,225,047 B2 * | 5/2007 | Al-Bayati et al. | 700/121 |
| 7,349,753 B2 * | 3/2008 | Paik | 700/110 |
| 7,356,377 B2 * | 4/2008 | Schwarm | 700/108 |
| 7,467,023 B2 * | 12/2008 | Brown | 700/100 |
| 7,499,897 B2 * | 3/2009 | Pinto et al. | 706/46 |
| 2005/0234763 A1 * | 10/2005 | Pinto et al. | 705/10 |

* cited by examiner

*Primary Examiner*—Maria N. Von Buhr
(74) *Attorney, Agent, or Firm*—Wade J. Brady, III; Frederick J. Telecky, Jr.

(57) ABSTRACT

A method of adjusting process variables in a processing flow is disclosed. Processed samples are tested to determine sample parameters of the tested samples. The sample parameters are analyzed analyzing in relation to the process variables applied in the processing steps to determine the impact of the process variables on the sample parameters The process variables are modified in an attempt to change the sample parameters towards predetermined target values. And, the sequence of processing steps is repeated with the modified process variables. The analyzing step includes, for given samples, automated matching between patterns of process variables applied for the samples and corresponding sample data sets of parameters determined from the samples; quantifying the degree of match in terms of score values associated with patterns of process variables; and determining the significance of said score values in terms of significance values based on the deviation of the parameters in the sample data sets from said predetermined target values.

11 Claims, 14 Drawing Sheets

```
Lot number 1234567
Wafer number    1 2 3 4 5 6 7 8 9 10 11 12 13 14 15 16 17 18 19 20 21 22 23 24 25
Implant         1 1 1 1 1 1 1 1 1 1  1  1  2  2  2  2  2  2  2  2  2  2  2  2  2
Diffusion       1 1 1 1 1 1 1 2 2 2  2  2  2  2  2  2  2  2  1  1  1  1  1  1  1

Implant
1 As dose 1.4E13 cm^-2
2 As dose 1.5E13 cm^-2

Diffusion
1 Temp. 1000C
2 Temp. 1020C
```

```
Lot number 1234567
Wafer number          1  2  3  4  5  6  7  8  9 10 11 12 13 14 15 16 17 18 19 20 21 22 23 24 25
Implant               1  1  1  1  1  1  1  1  1  1  1  1  1  2  2  2  2  2  2  2  2  2  2  2  2
Diffusion             1  1  1  1  1  1  1  2  2  2  2  2  2  2  2  2  2  2  1  1  1  1  1  1  1
Implant and Diffusion 1  1  1  1  1  1  1  2  2  2  2  2  2  3  3  3  3  3  4  4  4  4  4  4  4
```

Implant
1 As dose 1.4E13 cm^-2
2 As dose 1.5E13 cm^-2

Diffusion
1 Temp. 1000C
2 Temp. 1020C

Implant and Diffusion
1 As dose 1.4E13 cm^-2 and Temp. 1000C
2 As dose 1.4E13 cm^-2 and Temp. 1020C
3 As dose 1.5E13 cm^-2 and Temp. 1020C
4 As dose 1.5E13 cm^-2 and Temp. 1000C

| Lot number 1234567 | | | | | | | | | | | | | | | | | | | | | | | | | |
|---|---|---|---|---|---|---|---|---|---|---|---|---|---|---|---|---|---|---|---|---|---|---|---|---|---|
| Wafer number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Split1 | 1 | 1 | 1 | 1 | 1 | 1 | 1 | 1 | 1 | 1 | 1 | 1 | 2 | 2 | 2 | 2 | 2 | 2 | 2 | 2 | 2 | 2 | 2 | 2 | 2 |
| Split2 | 1 | 1 | 1 | 1 | 1 | 1 | 2 | 2 | 2 | 2 | 2 | 2 | 2 | 2 | 2 | 2 | 2 | 2 | 1 | 1 | 1 | 1 | 1 | 1 | 1 |
| Split3 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 |
| Split1 and Split2 | 1 | 1 | 1 | 1 | 1 | 1 | 2 | 2 | 2 | 2 | 2 | 2 | 3 | 3 | 3 | 3 | 3 | 3 | 4 | 4 | 4 | 4 | 4 | 4 | 4 |
| Split1 and Split3 | 1 | 2 | 1 | 2 | 1 | 2 | 1 | 2 | 1 | 2 | 1 | 3 | 4 | 3 | 4 | 3 | 4 | 3 | 4 | 3 | 4 | 3 | 4 | 3 | 4 |
| Split2 and Split3 | 1 | 2 | 1 | 2 | 1 | 2 | 1 | 3 | 4 | 3 | 4 | 3 | 4 | 3 | 4 | 3 | 4 | 3 | 4 | 2 | 1 | 2 | 1 | 2 | 1 |

Split1
1 Split1: Splitgroup1
2 Split1: Splitgroup2

Split2
1 Split2: Splitgroup1
2 Split2: Splitgroup2

Split3
1 Split3: Splitgroup1
2 Split3: Splitgroup2

Split1 and Split2
1 Split1: Splitgroup1 and Split2: Splitgroup1
2 Split1: Splitgroup1 and Split2: Splitgroup2
3 Split1: Splitgroup2 and Split2: Splitgroup2
4 Split1: Splitgroup2 and Split2: Splitgroup1

Split1 and Split3
1 Split1: Splitgroup1 and Split3: Splitgroup1
2 Split1: Splitgroup1 and Split3: Splitgroup2
3 Split1: Splitgroup2 and Split3: Splitgroup2
4 Split1: Splitgroup2 and Split3: Splitgroup1

Split2 and Split3
1 Split2: Splitgroup1 and Split3: Splitgroup1
2 Split2: Splitgroup1 and Split3: Splitgroup2
3 Split2: Splitgroup2 and Split3: Splitgroup2
4 Split2: Splitgroup2 and Split3: Splitgroup1

FIG. 13

| PARAMETER | SPLIT1 SCORE-VALUE | SPLIT2 SCORE-VALUE | SPLIT3 SCORE-VALUE | SPLIT1 AND SPLIT2 SCORE-VALUE | SPLIT1 AND SPLIT3 SCORE-VALUE | SPLIT2 AND SPLIT3 SCORE-VALUE | ALL SPLITS MAX-SCORE-VALUE | SPLIT WITH MAX SCORE-VALUE | SIGNIFICANCE OF MAX SCORE-SPLIT | OVERALL SCORE-VALUE |
|---|---|---|---|---|---|---|---|---|---|---|
| PARAMETER1 | 1.00 | 0.00 | 0.00 | 0.66 | 0.66 | 0.00 | 1.00 | SPLIT1 | 0.60 | 90.59% |
| PARAMETER2 | 1.00 | 0.00 | 0.00 | 0.66 | 0.66 | 0.00 | 1.00 | SPLIT1 | 0.30 | 69.76% |
| PARAMETER3 | 0.00 | 1.00 | 0.00 | 0.67 | 0.00 | 0.66 | 1.00 | SPLIT2 | 0.50 | 86.00% |
| PARAMETER4 | 0.95 | 0.02 | 0.00 | 0.99 | 0.63 | 0.01 | 0.99 | SPLIT1 AND SPLIT2 | 1.20 | 98.67% |
| PARAMETER5 | 0.00 | 0.00 | 0.99 | 0.00 | 0.66 | 0.67 | 0.99 | SPLIT3 | 0.51 | 86.78% |
| PARAMETER6 | 0.38 | 0.00 | 0.00 | 0.25 | 0.25 | 0.00 | 0.38 | SPLIT1 | 0.01 | 1.41% |
| PARAMETER7 | 0.00 | 0.00 | 0.00 | 0.01 | 0.00 | 0.00 | 0.01 | SPLIT1 AND SPLIT2 | 0.03 | 0.06% |
| PARAMETER8 | 0.00 | 0.00 | 0.00 | 0.00 | 0.00 | 0.00 | 0.00 | SPLIT1 AND SPLIT2 | 0.03 | 0.02% |

| NUMBER | PARAMETER | SPLIT (AND CROSS SPLIT) | Max-Score-Value | SIGNIFICANCE OF Max-Score-Value | OVERALL SCORE-VALUE |
|---|---|---|---|---|---|
| 4 | PARAMETER4 | Split1 and Split2 | 0.99 | 1.20 | 98.67% |
| 1 | PARAMETER1 | Split1 | 1.00 | 0.60 | 90.59% |
| 5 | PARAMETER5 | Split3 | 0.99 | 0.51 | 86.78% |
| 3 | PARAMETER3 | Split2 | 1.00 | 0.50 | 86.00% |
| 2 | PARAMETER2 | Split1 | 1.00 | 0.30 | 69.76% |
| 6 | PARAMETER6 | Split1 | 0.38 | 0.01 | 1.41% |
| 7 | PARAMETER7 | Split1 and Split2 | 0.01 | 0.03 | 0.06% |
| 8 | PARAMETER8 | Split1 and Split2 | 0.00 | 0.03 | 0.02% |

METHOD OF ADJUSTING PROCESS VARIABLES IN A PROCESSING FLOW

The invention relates to methods for adjusting process variables in a processing flow that comprises a sequence of processing steps. A typical application is the development of optimized process flows in the semiconductor industry, but other applications are envisioned as well.

BACKGROUND

The fabrication of integrated circuits (ICs) requires the processing of single-crystal (silicon) wafers in a large number of subsequent process steps. The total set of process steps that belongs to a specific technology is called a "process flow" or just simply a "flow." During each step, the silicon and other involved materials are structured, modified, transformed or in other ways manipulated. The outcome of one process step is then passed on as input to the next. Prominent examples of process steps in semiconductor fabrication are epitaxy, oxidation, film deposition, lithography, etching, ion implantation, and diffusion.

Each process step is characterized by a great variety of process parameters. These correspond directly to specific equipment settings and/or programs ("recipes") by which the actual fabrication process is determined and controlled. Examples of process parameters include things like growth- or deposition-rates, the composition of gas flows or chemical etchants, exposure times, etch times, furnace temperatures, implant species, implant energies and doses, bias voltages or currents, wait times, and the like.

Once a technology is fully developed, the corresponding process flow is "frozen." From then on, all process parameters may only vary within a narrow range around previously defined "target" values. This narrow bandwidth is called the specification range or shortly the "spec range."

Silicon wafers are typically processed in lots of 25, i.e., groups of 25 wafers receive the same treatment, either because they are indeed simultaneously processed in the same piece of equipment or because they are processed in a short sequence as a batch. To develop or improve a technology, it is fundamental to run experiments at various process steps. Therefore, the wafers of "experimental lots" are split up into groups. Different split groups vary at least at one process step in at least one process condition. Wafers that belong to the same split group undergo the same processing. The term "wafer split" (or simply "split") is used as synonym for "process experiment" herein.

Whether a wafer lot has been split up or not, once it has passed the last process step, it will be more or less extensively tested. The data is then evaluated and analyzed and the results are fed back into the process flow. For standard production material (with typically no applied splits), this is done in order to monitor the process and to enable failure analysis for development material (typically including a number of different splits) to achieve and/or improve a certain device performance. In the context of the invention, focus is on the latter.

A fundamental feedback loop in semiconductor manufacture involves processing, test, evaluation and analysis. Parametric data analysis, however, quite naturally requires a different evaluation approach for device and process development than for monitoring high-volume production. In standard high-volume production (usually) a great many lots are processed in a uniform manner; whereas the wafer splits during development phases are typically applied on just a restricted number of lots. For development material, however, the application of rather complex experimental split matrices and a largely extended test depth, with parameter numbers easily ranging up to several thousands, literally demand for a new methodology to facilitate data evaluation. Evaluating the impact of experimental splits—not to mention possible cross-dependencies—on such extended numbers of (electrical) parameters is not only prone to errors, but in many cases proves to be impossible for more than just the primary parameters. Conventional statistical methods/concepts, such as correlation calculus, ANOVA, CPK, etc., are valuable, but simply not sufficient. Intelligent data reduction becomes the key to achieve and maintain efficiency (and cost effectiveness).

SUMMARY

The invention provides an automated data assessment which enables the developer to quickly focus the analysis on those parameters that are truly and significantly affected by an experimental split and/or cross-split.

Specifically, the invention provides a method of adjusting process variables in a processing flow that comprises the following steps: testing processed samples to determine sample parameters of the tested samples; analyzing the sample parameters in relation to the process variables applied in the processing steps to determine the impact of the process variables on the sample parameters; modifying the process variables in an attempt to change the sample parameters towards predetermined target values; and repeating the sequence of processing steps with the modified process variables.

In described embodiments, the analyzing step includes, for given samples: automated matching between patterns of process variables applied for the samples and corresponding sample data sets of parameters determined from the samples; quantifying the degree of match in terms of score values associated with patterns of process variables; and determining the significance of the score values in terms of significance values based on the deviation of the parameters in the sample data sets from the predetermined target values.

In a preferred application, the processing flow is a semiconductor technology development flow and the processing steps involve application of different patterns of processing variables to different samples in a lot of semiconductor wafers. Because of the application of the invention, manual inspection is confined to a reduced data set, easily saving 90% or more of the usual time needed to analyze the full data.

BRIEF DESCRIPTION OF THE DRAWINGS

Further aspects of the invention will become apparent from the following detailed description, with reference to the accompanying drawings, wherein:

FIG. 3 is a table illustrating a split matrix containing a cross-split;

FIG. 4 is a table illustrating a split matrix including cross-splits;

FIG. 13 is a table listing score values and significance values for the test parameters in relation to the split matrix of FIG. 4;

DETAILED DESCRIPTION OF EMBODIMENTS

Figures 1, 2:
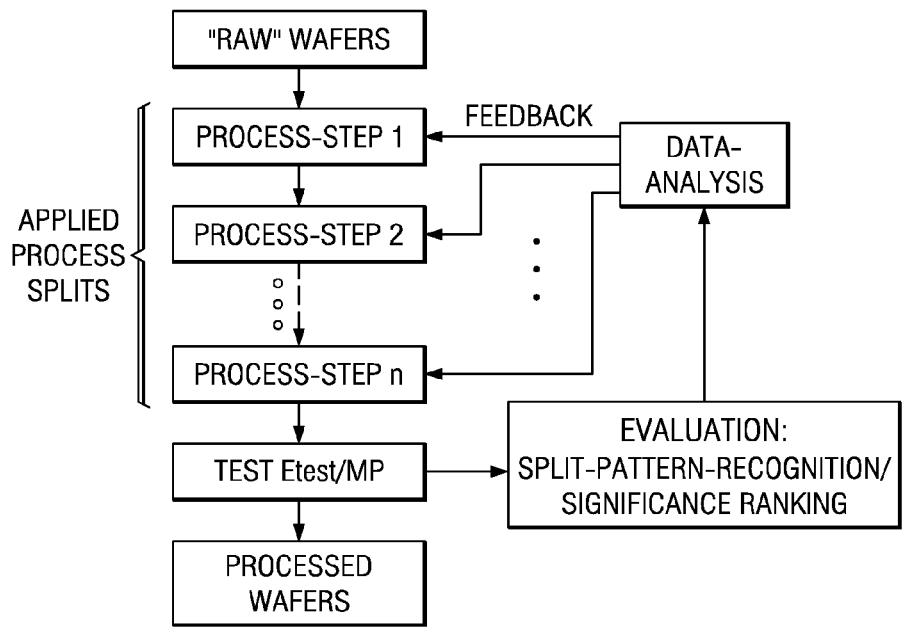
FIG. 1 is a simplified flow chart that illustrates a fundamental feedback loop in accordance with an embodiment of a method of the invention.
FIG. 2 is a table illustrating a simple split matrix.

With reference to FIG. 1, raw wafers are provided in an initial step. The wafers are subjected to a sequence of process steps 1 to n. At the end of the process flow, the wafers are tested (Etest, MP). As a result of the testing, parametrical test data are obtained. The parametrical test data are evaluated with the inventive method for split pattern recognition and significance ranking. Based on the resulting overall score values for the test parameters and the corresponding splits or cross-splits, the test results are then analyzed. The results of the analysis provide an input to the various process steps, which are adjusted in an attempt to align the test parameters with predetermined target values. This closes the feedback loop, which will be repeated until the process flow has been optimized to satisfaction.

At "Test", a distinction between "Etest" and "MultiProbe" (=MP) is made. Etest engineering-checks and verifies the electrical performance on the device level (i.e., it measures the parameters of individual devices such as transistors, diodes, capacitors, resistors, inductors, etc.; and is sometimes also called "parametric test"). MultiProbe engineering, on the other hand, checks and verifies the functionality on the circuit level. For the purpose of this disclosure, considerations are confined to parametrical, i.e., Etest data. This, however, should not in any way restrict the applicability of the disclosed method.

The suggested method has been developed to meet the need for an "intelligent" data reduction. To actually perform the automated data assessment, the method can be cast into a software tool, implemented as part of the fundamental feedback loop. The tool helps to largely speed up general split-lot evaluations. The algorithm in the inventive method executes the following six steps for a given process split matrix and the resulting set of parametric data:

1) automatically identifies parameters which are likely to be affected by a specific split;

2) determines possible cross-splits (i.e., superimposed primary splits given in the split matrix) and, as in 1), automatically identifies parameters which have a high possibility for being affected by the cross-split;

3) conducts, for every parameter in the data-set and all possible splits/cross-splits, an automated ranking which yields the best-fitting parameter split combination;

4) calculates a "significance value" for every best fitting parameter split combination by comparing it to a given specification (e.g., the process control document) and so determines an "overall score value";

5) sorts all parameters according to this overall score value;

6) creates split graphs and statistical split summaries for the most significant parameter split combinations and formats them in a way that they can be readily analyzed;

Steps 1) and 2) are done by abstract pattern recognition. At the heart of the procedure is a general methodology that compares abstract split patterns with patterns found in parametric data. Based on a specific "sameness" methodology, various sets of score values are calculated that focus on different aspects of the comparison. Employing concepts of fuzzy logic operations, these subordinate score values get combined to an overall score value which is eventually used to do the ranking of the parameter split combinations (data reduction).

The basic concepts of the split pattern recognition and significance ranking procedure are outlined below by means of fictitious examples, which will also help to further illustrate some of the terminology.

The application of split matrices to wafer lots has been previously considered. A split matrix in this context is a schematic table that assigns process conditions to wafer numbers. FIG. 2 shows a simple example.

For the fictitious 25-wafer lot with number #1234567, there are two splits (i.e., process experiments) at two different process steps, namely an implant dose split (As=arsenic) and a diffusion temperature split. Each of the splits contains two split groups (wafer groups with varying process conditions). For the implant split, split-group1 consists of wafers 1-13 with an arsenic implant dose of $1.4E13$ $cm^2$ and split-group2 consists of wafers 14-25 with an arsenic-dose of $1.5E13$ $cm^2$. For the diffusion split, on the other hand, split-group1 consists of wafers 1-7 and 20-25 with a process temperature of 1000° C. and split-group2 consists of wafers 8-19 with a temperature of 1020° C. (see the corresponding numbers in front of the first column split-group descriptions, and in the two split rows below the wafer numbers). In this table form, there is a unique correlation between wafer number and split-group for every experimental split applied to a specific lot which is processed according to a specific flow. In general, as will be seen below, neither the number of splits nor the number of split-groups is limited to two as in this simple example. It should be kept in mind that the term "split" designates a certain process experiment (as a whole) and the term "split-group" designates a certain group of wafers which actually undergo the same process condition as part of a specific experiment (split).

The two splits of the previous example (i.e., the implant split and the diffusion split) will be called "primary splits" or splits of "cross-split level 1", because they represent the real process conditions that have actually been applied to a certain lot. In reality, however, two or more splits will often have a "cross-impact" on certain electrical parameters, i.e., the variation of a specific Etest parameter will be influenced by more than just one process experiment. In the case of our example of FIG. 2 this would mean that a certain device parameter (Etest parameter) reacted to the variation in the arsenic implant dose and the temperature difference in the diffusion step. To be able to deal with such cross-impacts we have to supplement the original split matrix by "cross-splits". For the previous example, this means we have to determine the superposition of the implant and the diffusion split. FIG. 3 shows this superposition. In principle we have the same table as in FIG. 2 with just a new split entry below the wafer row and the corresponding split descriptions at the bottom of the table. The new split is labeled "Implant & Diffusion" to show which primary splits the cross-split is composed of. Contrary to the primary splits, the cross-split has four different split-groups: split-group1 with wafers 1-7 (As dose $1.4E13$ $cm^2$, diffusion temp. 1000° C.), split-group2 with wafers 8-13 (As dose $1.4E13$ $cm^2$, diffusion temp. 1020° C.), split-group3 with wafers 14-19 (As dose $1.5E13$ $cm^2$, diffusion temp. 1020° C.) and split-group4 with wafers 20-25 (As dose $1.5E13$ $cm^2$, diffusion temp. 1000° C.).

Every split-group of the cross-split represents a unique combination of the original split conditions of the two primary splits. In this case, there are 2×2 possible combinations, so that we have 4 new cross-split-groups in total.

This cross-split is a secondary split (cross-split level 2), because two primary splits have been superimposed to form the new split-groups. Analogously, the combination of three primary splits would yield a cross-split of level 3 and so on. (It goes without saying that there had to be at least three primary splits in the original split matrix to build such a tertiary cross-split.) For a given primary split matrix the developed algorithm automatically builds all possible cross-splits up to a user-defined cross-split level. Once they have been created, these cross-splits are treated exactly the same way as the original primary splits during the subsequent evaluation.

Now that the terms "split" and "split-group" on the one hand and the concept of "cross-splits" on the other hand have been introduced, we are not going to use this simple split matrix, whose only purpose was to provide an explanatory example. To illustrate the split pattern recognition and significance ranking methodology we need to proceed from concrete process conditions and use "abstract splits" (see FIG. 4) instead.

FIG. 4 shows the matrix of three primary splits (Split1-Split3) with two split-groups each and the superpositions of all possible secondary splits (cross-split level 2), which have four split-groups each. The possible tertiary split (cross-split level 3) will be neglected.

The evaluation methodology will be applied to a fictitious set of eight test parameters representing, e.g., a number of Etest reads. "Read" in this context is used as synonym for "parameter". FIGS. 5 to 12 show the variations of these parameters as function of the wafer number. Wafer numbers (1-25) are displayed along the x-axis, parameter values along the y-axis. The little diamonds represent the wafer averages, the associated vertical columns represent the standard deviations ($\pm\sigma$). Parameter values are given in arbitrary units (=a.u.). The wider dashed line represents the (assumed) target value of the parameter (=TARGET), the upper solid line represents the upper specification limit (max. spec. limit=SPCmax), and the lower shorter dashed line represents the lower specification limit (min. spec. limit=SPCmin). The numerical spec. values for each plot in addition to some other data, is automatically provided by the program (see FIGS.). This data becomes relevant in practical cases, but is of no importance for the following explanations.

Figure 5:
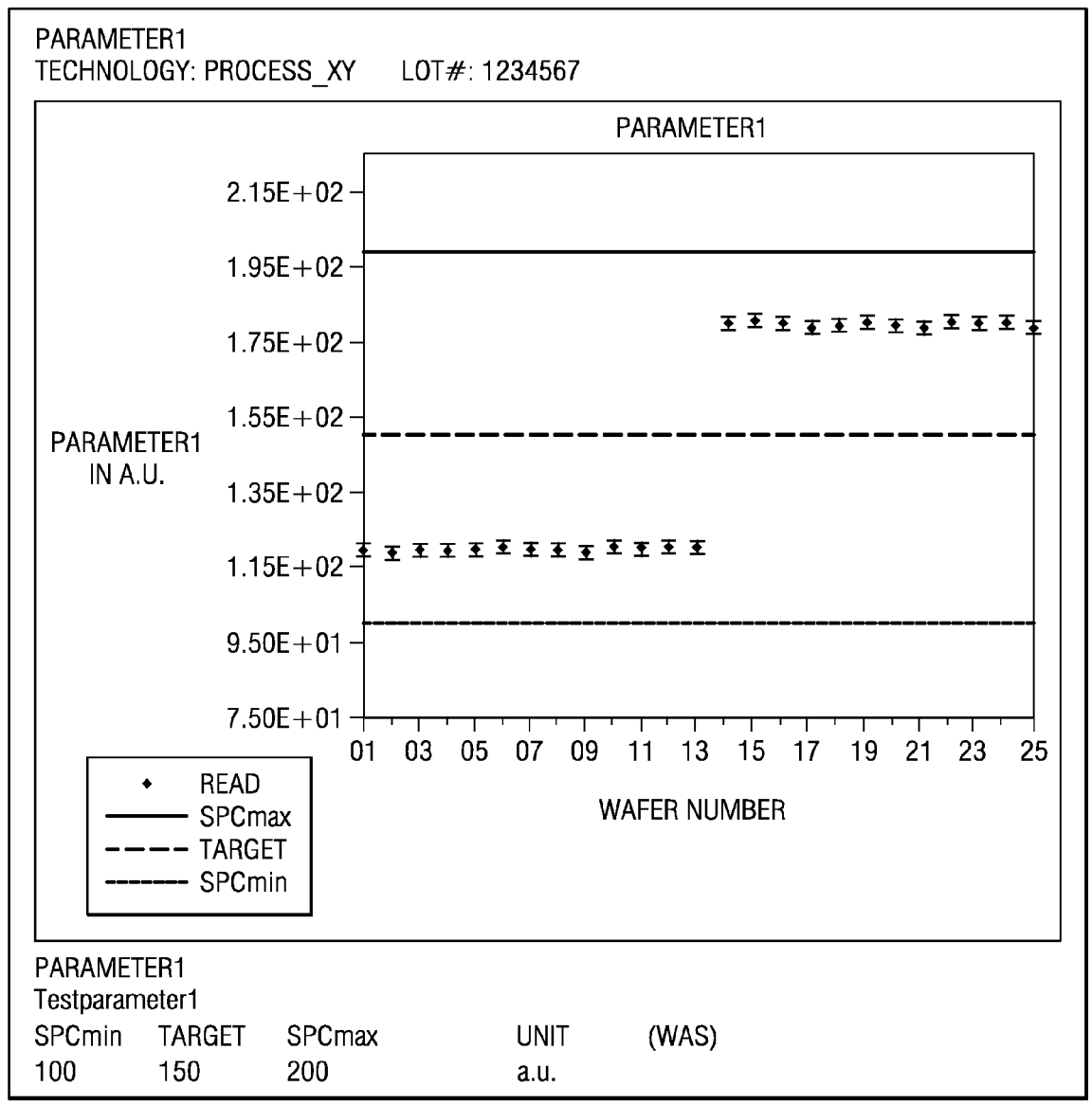
FIGS. 5 to 12 are wafer graphs of different test parameters.
Figure 6:
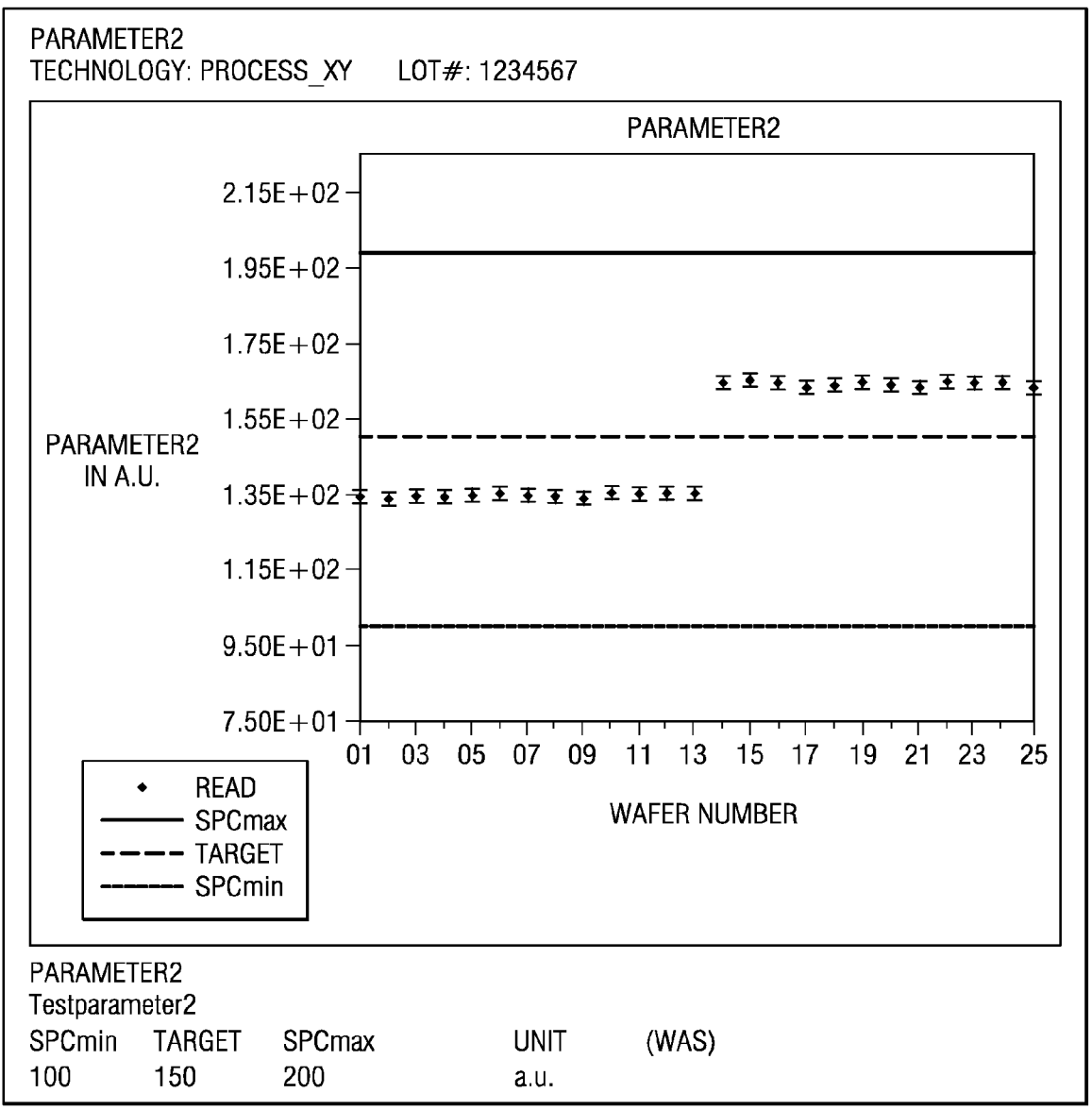
Figure 7:
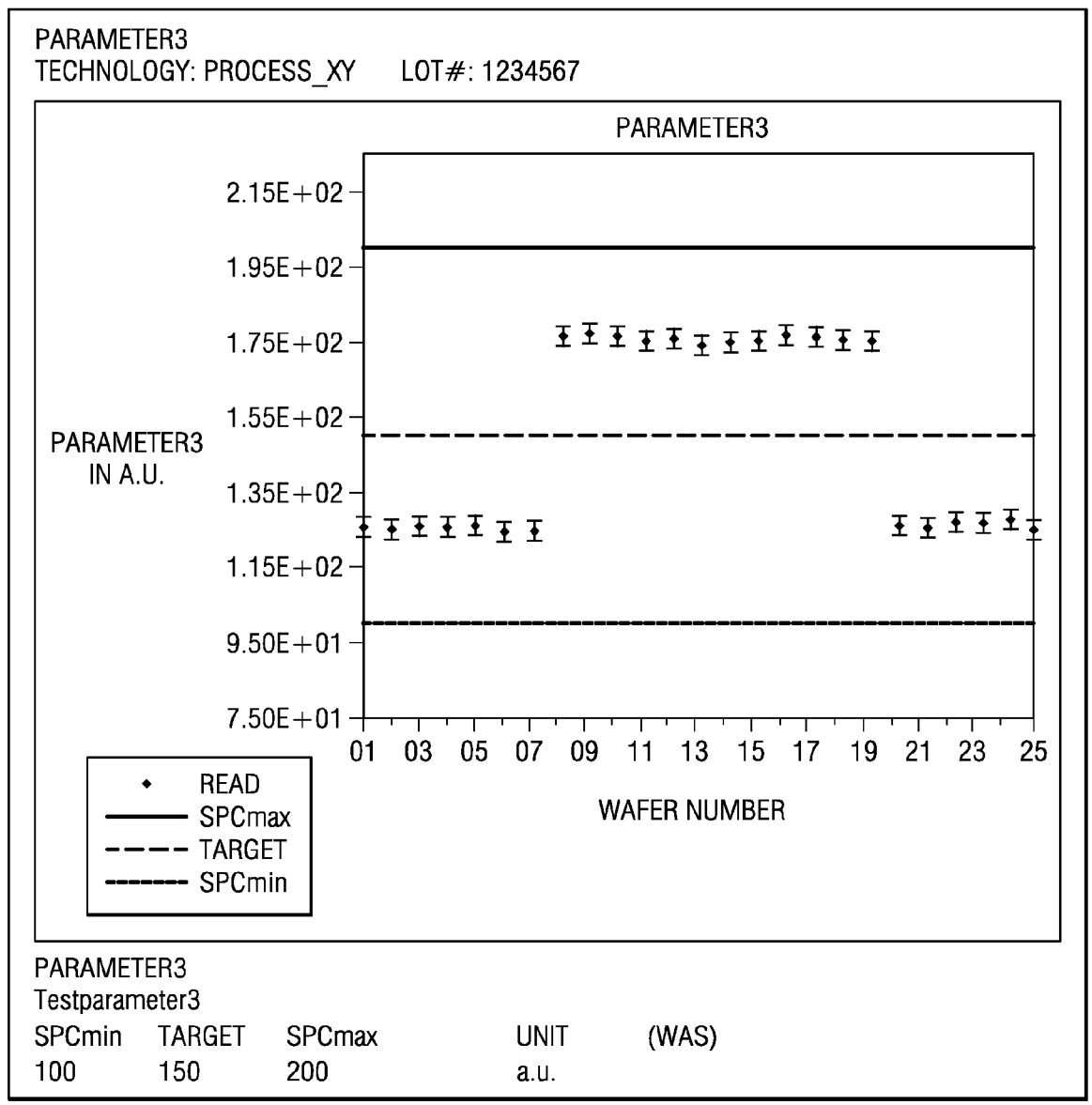
Figure 8:
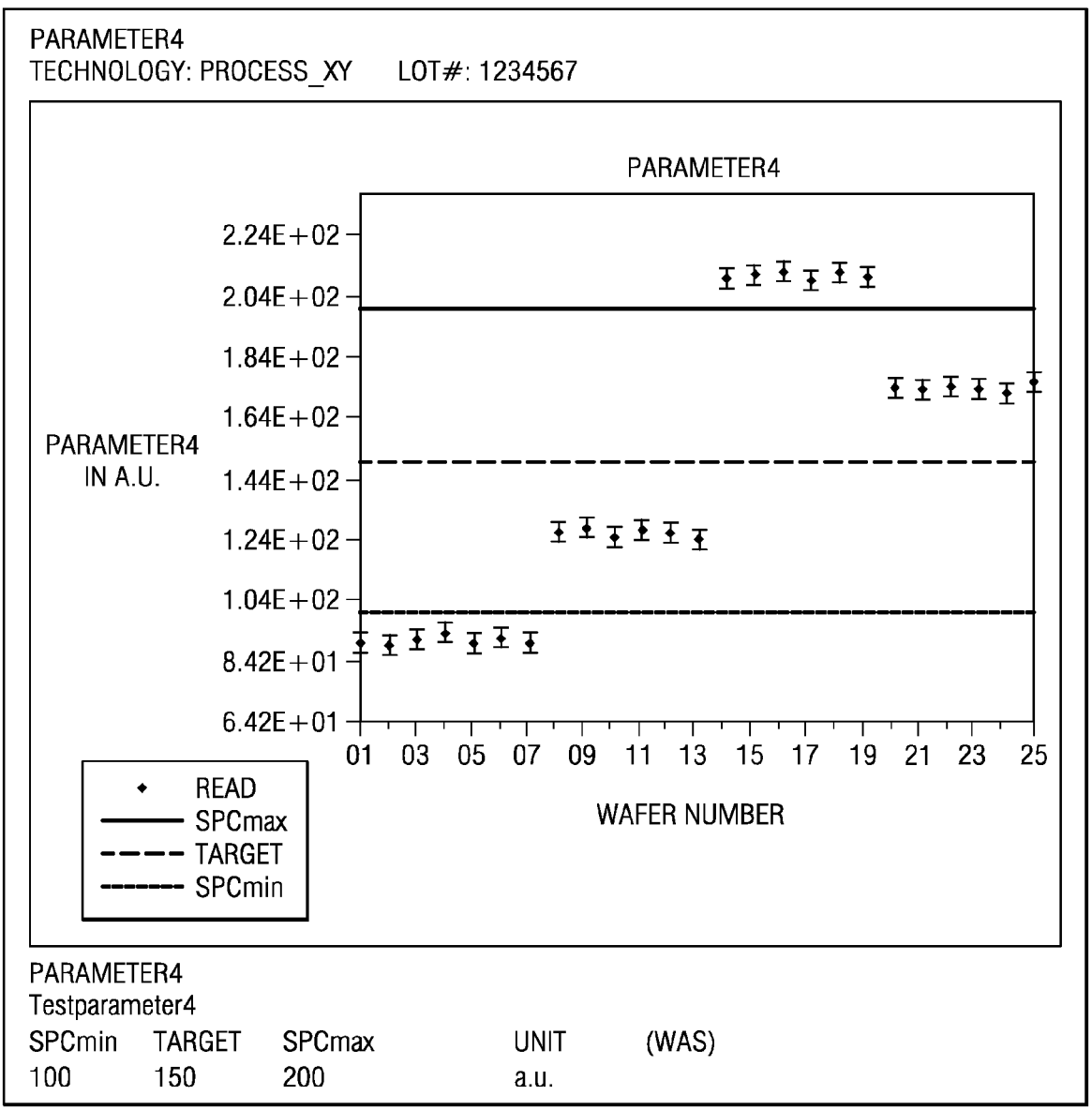
Figure 9:
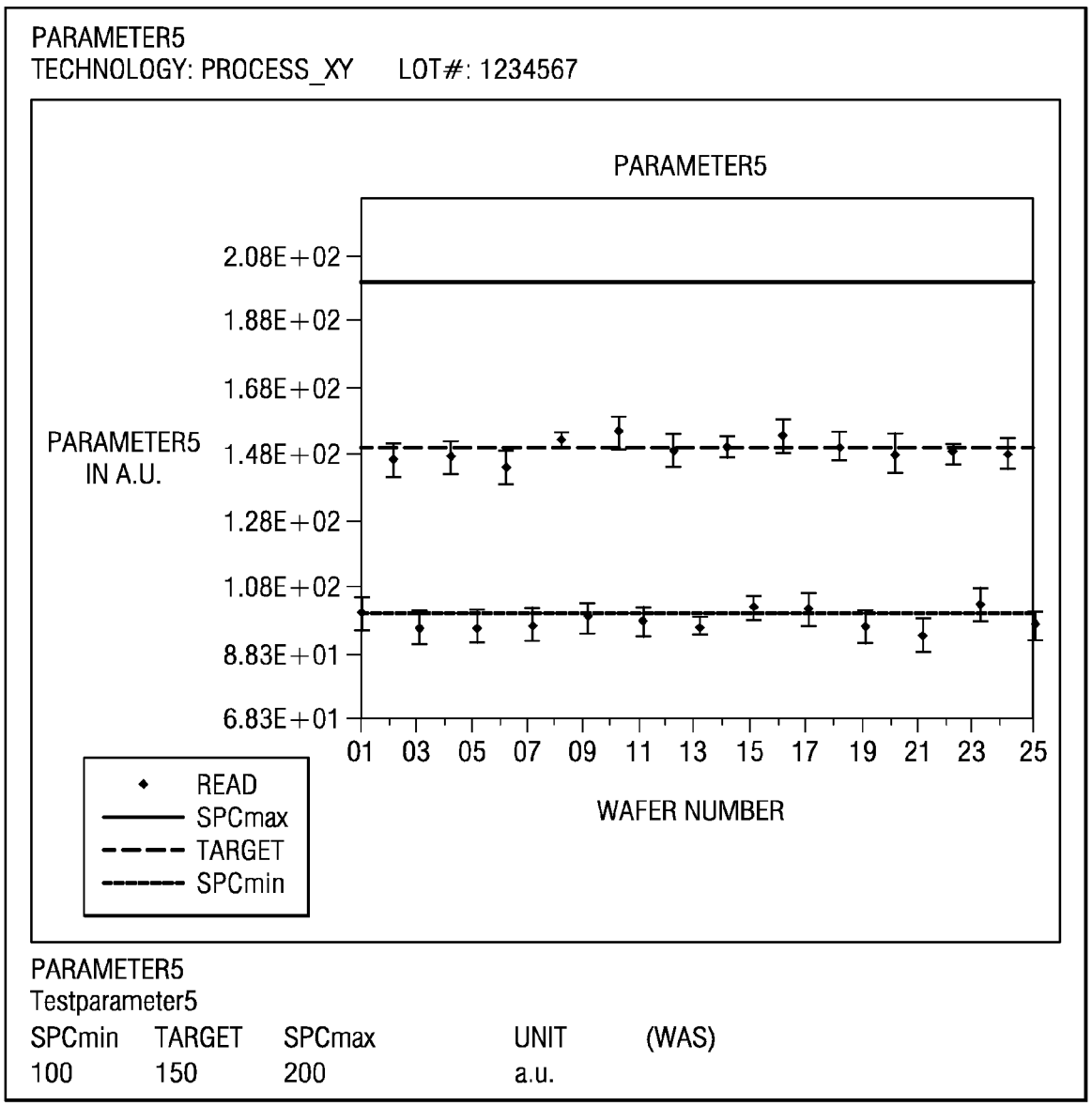
Figure 10:
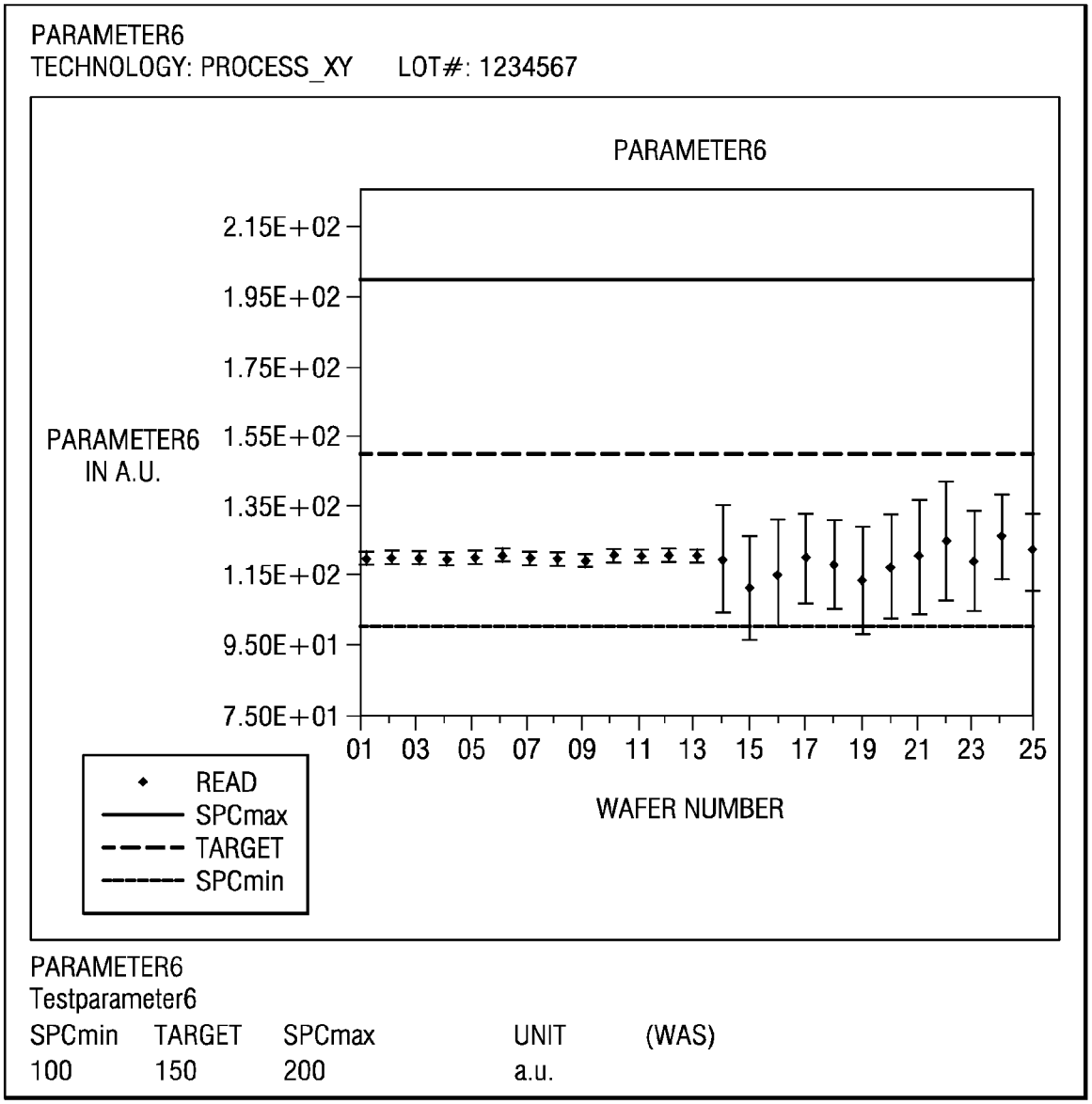
Figure 11:
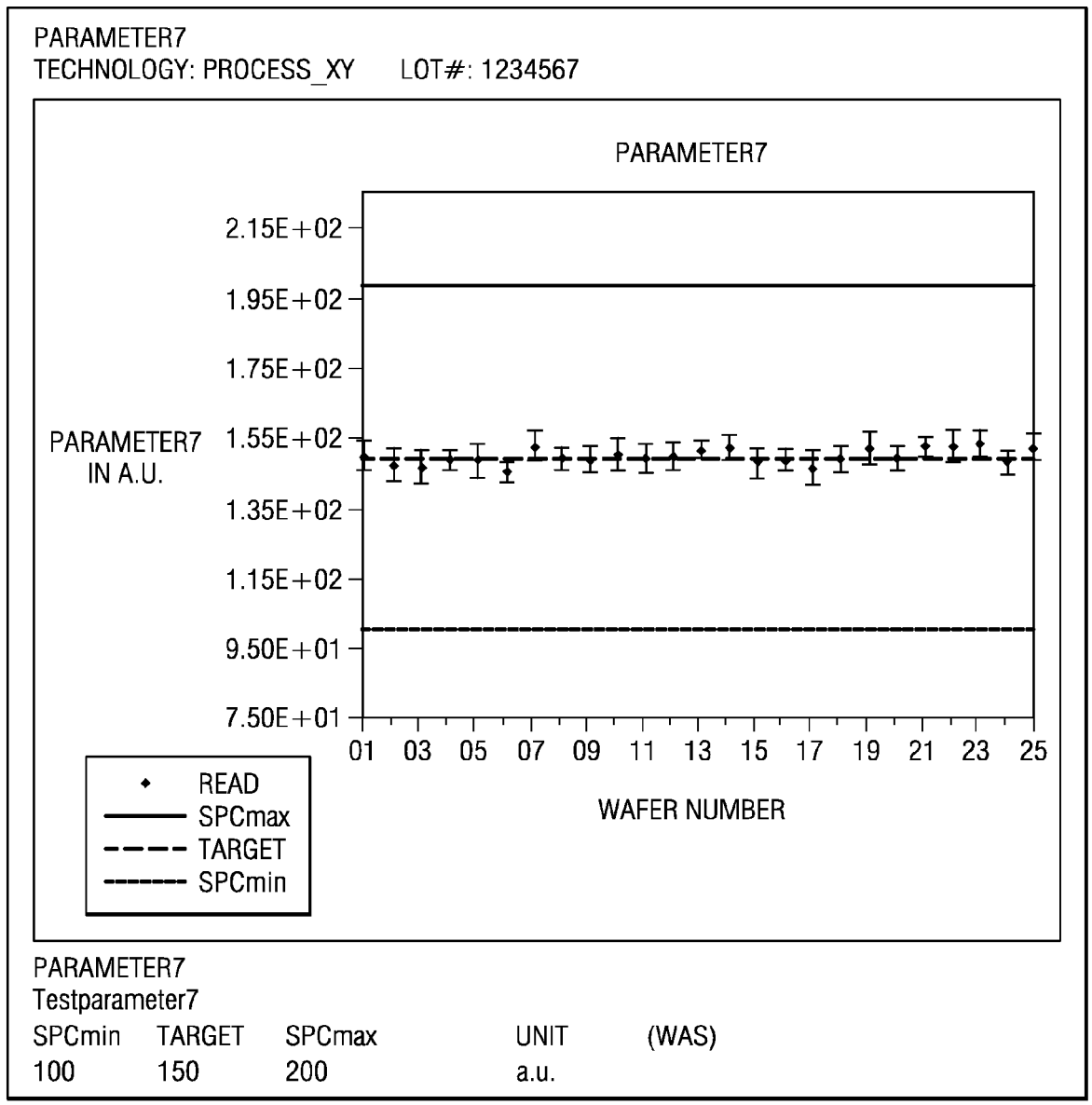
Figure 12:
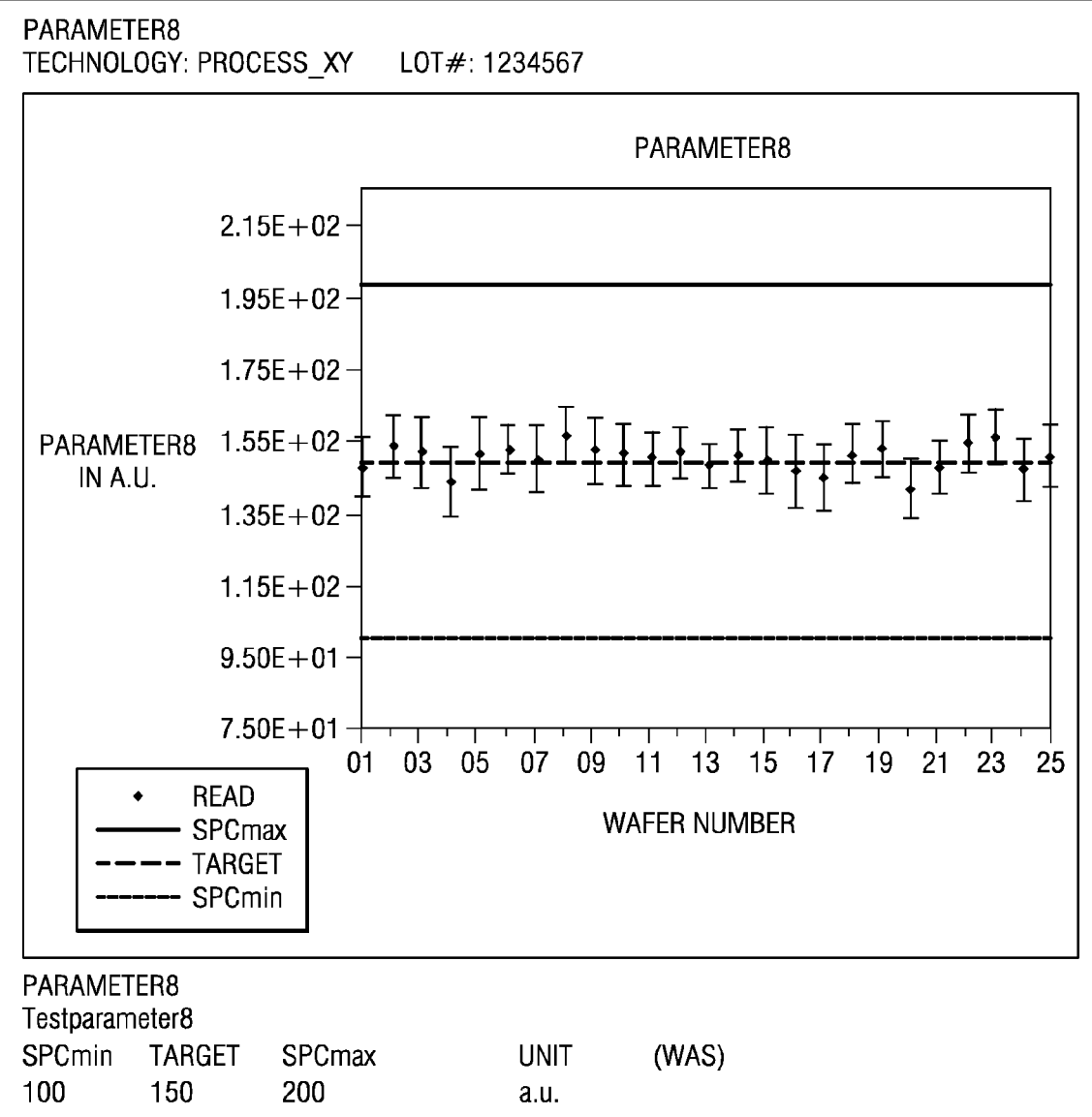

FIGS. 5 to 12 show a number of selected examples in a manner that could be found in real data as well. FIGS. 5 and 6 (parameters 1 and 2), for example, depict the case of a two-fold split (i.e., a split including two split-groups) where the first 13 wafers have been differently processed from the last 12 wafers. But unlike parameter 1, the offset between the two split-groups is much smaller for parameter 2. In FIG. 10 (parameter 6), we see the same two-fold split, with the only difference that this time the group averages are about the same, only the standard deviations of both groups vary. FIGS. 7 and 9 (parameters 3 and 5) show two other examples of a two-fold split. Parameter 5, for example, exhibits a bimodal distribution which can often be found when wafers are processed in a two-chamber system (as might be the case, e.g., in some etch or sputter equipment). Parameter 4 in FIG. 8 breaks down into four different wafer groups, that could be the result of a cross-impact of the process splits underlying FIGS. 5 and 7. Lastly, FIGS. 11 and 12 show the behavior of two parameters that are not affected by any split—one parameter (parameter 8) displaying a larger variation than the other (parameter 7).

Figure 14:
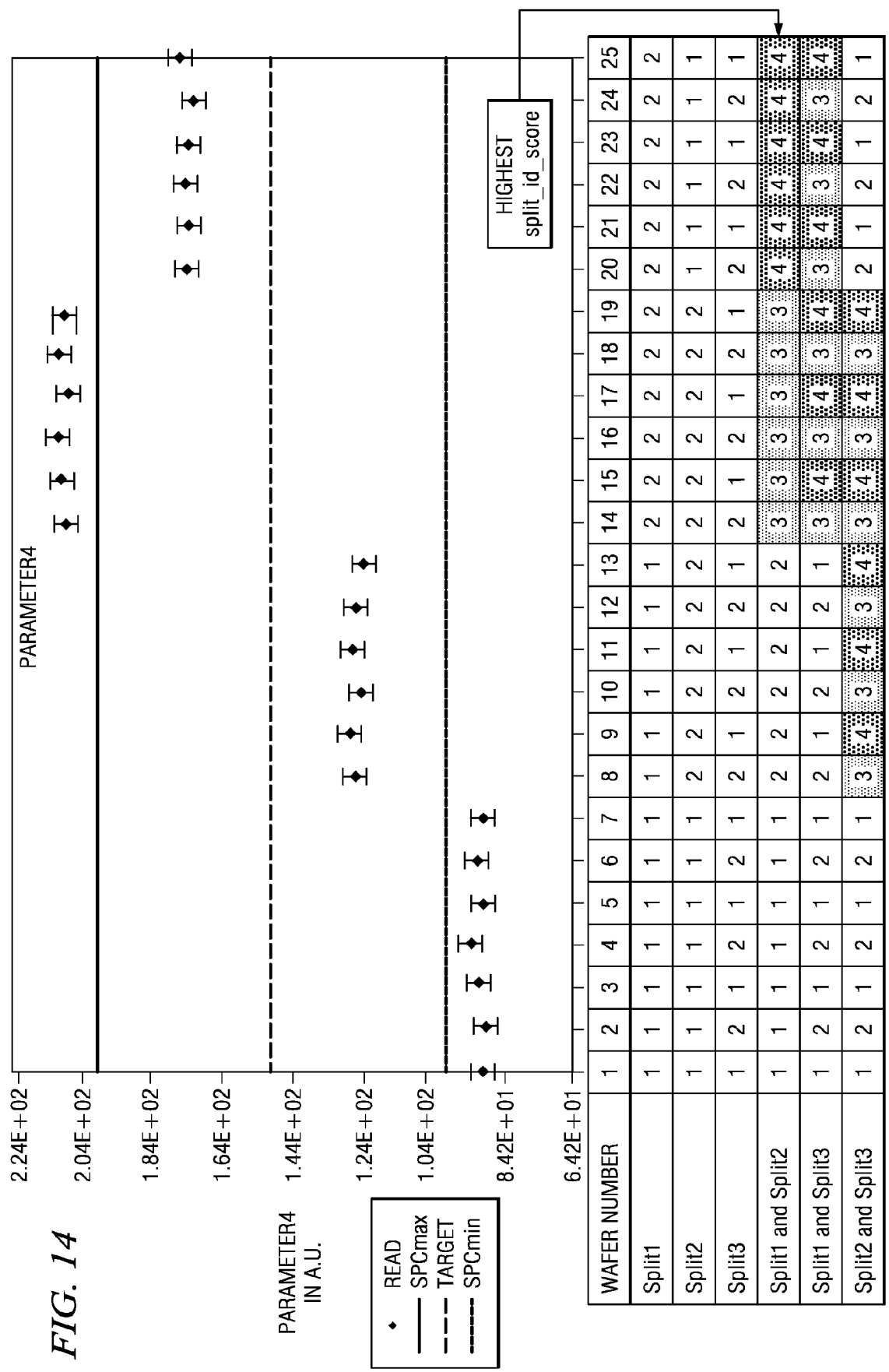
FIG. 14 is a chart illustrating the matching between parameters and split patterns.

Applying the split pattern recognition and significance ranking methodology on this test data yields the "score-table" in FIG. 13. The first column in FIG. 13 lists all the parameter names which could be found in the data set. The next columns contain for every possible parameter split and/or parameter cross-split combination, the so-called "split identification score value". Here, we have 3 primary splits and 3 secondary splits (cross-splits of level 2), i.e., there are 6 general splits in total. For every parameter split combination, we find a value between 0 and 1 representing a measure of the quality of the correspondence between split (or cross-split) and parametric data. A split id score (=split identification score value) close to 1 means that a split pattern could almost certainly be identified in the parametric data; whereas a value close to 0 indicates that there is no significant match between the split pattern and the data. For parameter 4 in FIG. 13, for example, we find a split identification score value of 0.95 for the pair "Parameter4/Split1", 0.02 for the pair "Parameter4/Split2", 0.99 for the pair "Parameter4/Split1 & Split2" (cross-split of primary splits 1 and 2), and 0.63 for the pair "Parameter4/Split1 & Split3" (cross-split of primary splits 1 and 3). All other values can be interpreted accordingly. That is, if we just look at parameter 4, we see that of all 6 splits the split pattern of the cross-split labeled "Split1 & Split2" exhibits the closest match with respect to the parametric signature of "Parameter4". This is illustrated in FIG. 14.

FIG. 14 again shows the parametric variation of "Parameter4". Additionally, the split patterns of FIG. 4 have been inserted in the bottom part. The split-groups of the various splits have been highlighted to emphasize wafer groups that belong together.

By simple inspection we see that, of all splits, the pattern of cross-split "Split1 & Split2" bears the most apparent resemblance to the parametric variation. But why is that?

If we take "Split1", for example, we would expect that the parametric values of wafers 1-13 (split-group1) are clearly distinct from those of wafers 14-25 (split-group2). Likewise we would expect that within each split-group the values should be approximately same. A quick glance at FIG. 14 reveals that the first criterion is fully met (the averages of wafers 1-13 are clearly lower compared to the averages of wafers 14-25), whereas the second criterion is only partially met (the averages of wafers 1-7 of split-group1, for example, are lower than for wafers 8-13 of the same split-group; within split-group2 we find a similar situation with wafers 14-19 having higher values than wafers 20-25). That is the reason why the split id score for the combination "Parameter4/Split1" already is quite high with a value of 0.95 (see FIG. 13), but has not fully reached 1 yet.

If we take "Split3", for example, the situation is completely different. This split shows an alternating pattern (one wafer of split-group1 is followed by a wafer of split-group2, etc.), i.e., for a parameter affected by this split we would therefore expect that it somehow mirrors this alternating pattern (as, e.g., can be found for "Parameter5"). However, we do not see any such behavior in FIG. 14. As a consequence we obtain a very low split id score for the combination "Parameter4/Split3" (the value is rounded to 0.00 in the table of FIG. 13).

As we have just seen, the combination "Parameter4/Split1" already yields a relatively high split id score of 0.95. But what seems to be a good match can still be improved considering cross-splits as well. If we look at the superposition of "Split1" and "Split2" ($\rightarrow$"Split1 & Split2"), for example, we obtain a cross-split pattern with four distinct split-groups composed of wafers 1-7, 8-13, 14-19 and 20-25 respectively (see FIG. 14). Another look at FIG. 14 now makes it more or less self-evident that this wafer allocation means the perfect match between split pattern and parameter variation. All four of the split-groups can be clearly distinguished from each other and, additionally, are fairly homogeneous in themselves. This finds its expression in a split id score of 0.99 which is very close to 1 (the highest possible value). Since 0.99 is the highest split id score in connection with "Parameter4", it is highlighted in the table of FIG. 13. All the other splits and/or cross-splits yield lower identification scores for this specific parameter.

The columns in FIG. 13 labeled "All Splits/Max-Score value" and "Split with max Score value" collect these highest split identification scores together with their corresponding split descriptions for all included parameters. As a result we obtain a list which, for every parameter, yields the corresponding split or cross-split that fits best to the respective parametric variation. For example, for the parameter labeled "Parameter1", the split labeled "Split1" has the highest split id score with 1.00. The same is true for "Parameter2". For "Parameter3", "Split2" shows the best matching with a split id score of 1.00. For "Parameter4", as we have seen, it is the cross-split "Split1 & Split2" with 0.99, etc.

It must be mentioned that the split id scores under real conditions normally do not reach values as high as in these explanatory examples. (There are mainly two reasons for this: 1) the distributions are usually broader (→data overlap); and 2) the differences between split group averages are typically not as pronounced as in the given examples.) For typical cases, split id scores exceeding 0.60 already indicate good, scores greater than 0.80 even excellent matches. On the other hand, if for a specific parameter the highest split id score is small (typically less than 0.20) or even minimal—as it is the case for "Parameter7" (with 0.01) or "Parameter8" (with 0.00)—no correspondence between the parametric variation and any of the split or cross-split patterns could be identified.

Once the list of the highest split id scores has been calculated, the most important step for the split pattern recognition and significance ranking has been done. The multitud" of possible parameter split assignments has been reduced to a 1:1 correlation (parameter ↔ best fitting split pattern), and with the split identification score value, we have a (first) cardinal measurable quantity which defines a transitive order on the assigned parameter split pairs.

However, what has been achieved so far is not fully sufficient to assess the impact of process splits on a set of parameters. For this, we need to consider yet another important aspect: the split identification score values we have been using so far can be determined completely independent of any additional (external) data. For their calculation, we only need to know the split pattern (as, e.g., given in FIG. 4) and the "pure" parametric data (as, e.g., given in FIGS. 5 to 12). Now, if we take the previous example (FIG. 13), we find that for "Parameter1" as well as "Parameter2" the split labeled "Split1" yields the highest split id score in both cases with a numerical value of 1.00. That means both parameters have been clearly identified to reflect the pattern of "Split1". A look at the diagrams in FIGS. 5 and 6, however, shows that the difference between the two split-groups of "Split1" (i.e., wafers 1-13 and wafers 14-25) with respect to the given specification range (spec range) is much smaller for "Paramater2" than it is for "Parameter1". The spec range for all eight test-parameters goes from 100, the spec minimum (=SPCmin), to 200, the spec maximum (=SPCmax), the ideal target value being 150 (=TARGET). "Parameter1" now possesses an average of 120 for split-group1 and 180 for split-group2, whereas the average of "Parameter2" for split-group1 is 135 and 165 for split-group2. If we take the spec width as reference, the parametric variation caused by "Split1" therefore extends over $$60\% \left( \triangleq 0.6 = \frac{180-120}{200-100} \right)$$

of the spec-range of "Parameter1", but only $$30\% \left( \triangleq 0.3 = \frac{165-135}{200-100} \right)$$

of the spec-range of "Parameter2". This teaches us two things: Split id scores just quantify how good specific split patterns are mapped to certain parameters. They do not quantify the split-significance. This is true no matter whether parameters respond to the same split, as in the case above ("Split1"), or to different splits, as e.g. in the case of "Parameter2" and "Parameter3" ("Parameter3" has its highest split id score of 1.00 for "Split2", see FIG. 13).

That is the reason why the suggested methodology for a split identification is supplemented by a method for a significance ranking. The ratio of split-group offset to spec width, which has just been calculated, will be called the "significance value" of a split. When a split includes more than two split-groups, the split-group offset is defined as the difference between the average value of the highest and the lowest split-group.

The significance values of the splits with the highest split id scores are listed in FIG. 13 under "Significance of max Score-Split". Here we find a "significance" of 0.60 for the pair "Parameter1/Split1", 0.30 for "Parameter2/Split1", 0.50 for "Parameter3/Split2", 1.20 for "Parameter4/Split1 & Split2", etc. From the last number we see that the significance can adopt values exceeding unity, i.e., the variation between highest and lowest split-group is larger than the actual spec range.

Now we have two separate characteristics—the split id score and the significance value—which must be combined to obtain the so-called "overall score value". This overall score value is also a cardinal measurable quantity and constitutes the last column in the table of FIG. 13. The transitive order defined by it, can eventually be used to rank the parameter split-pairs and therefore to actually reduce the data for the following (manual) analysis.

The combination of the different characteristics (in order to obtain the split id scores and the overall score values) is done by employing basic principles of fuzzy logic operations.

Figures 15, 16:
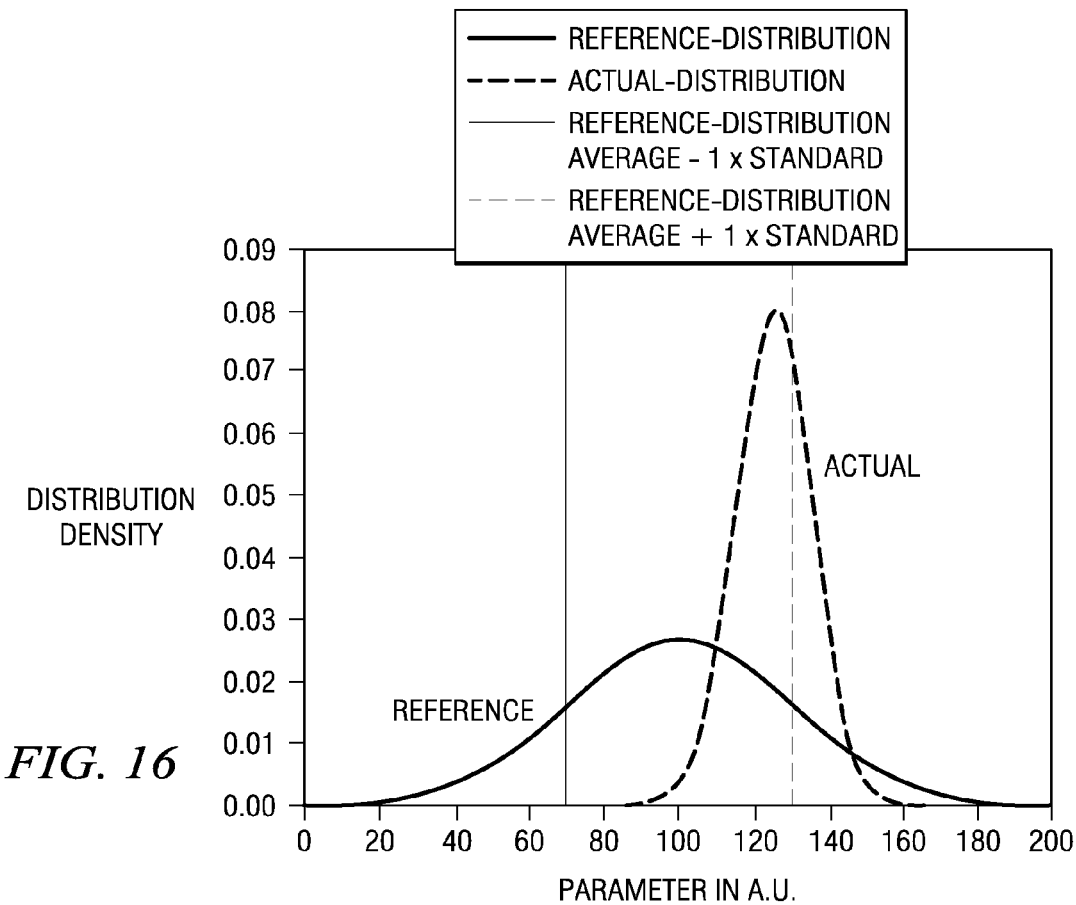
FIG. 15 is a split-score table listing the parameters with their highest score value, significance value and overall score value for the corresponding splits and cross-splits.
FIG. 16 is a diagram illustrating parametrical distributions.

FIG. 15 depicts the pairs of best-fitting parameter split combinations together with their corresponding "max-score values", "significances" and "overall-score values". This "final score-table" has been sorted according to the overall score values, which are given as percentage values in the last column of FIG. 15.

As we can see, the combination of "Parameter4/Split1 & Split2" possesses the highest overall score value, although its split id score is slightly less than that of the pair "Parameter1/Split1". This is due to the fact that the significance of the cross-split "Split1 & Split2" for "Parameter4" is twice as high as that of "Split1" for "Parameter1".

A score-table as given in FIG. 15 is the main result of the split pattern recognition and significance ranking procedure, because it tells the person doing the following (manual) in-depth analysis which parameter split combinations are actually worthwhile to be inspected and, on the other hand, which parameters may be neglected without taking the risk of missing any major effect. It is the first aspect that simplifies the analysis, but it is the second aspect that greatly reduces the overall time needed to actually do the analysis.

The preceding disclosure illustrated what kind of input is needed (i.e., the actual parametrical data, the primary split matrix and the specifications for the various parameters), what sort of output will be obtained (i.e., the full split matrix including cross-splits, the split id score- and significance-table and the overall-score-table with the best-fitting parameter split-pairs ranked according to their overall-score value), and how this output must be interpreted in order to facilitate the following data analysis. Despite the fact that only basic elements of conventional statistics and fuzzy logic operation are utilized to conduct the split identification and significance ranking, the concrete methodology used therein is completely new. Furthermore, the underlying principle could also be taken as a basis for a more general approach for parametrical data assessment.

In order to calculate the score and significance values listed in FIG. 15 the following issues have to be resolved: How can different distributions be compared? What makes a split (or cross-split) unique and distinguishable from another one and how can the differences be quantified? How can these quantities be combined to yield an overall-score value which finally allows the necessary ranking of the different parameter split pairs?

Process experiments (splits) usually lead to intended or unintended parameter variations which will be measured at Etest (see FIG. 1). Quite naturally, these tests are carried out on all wafers within a lot and on several sites distributed over the wafer. As a consequence, one must be able to compare parameter distributions rather than single parametrical values. FIG. 16 shows an example of two such parametrical distributions to be compared.

In FIG. 16, a reference distribution REF and a measured (actual) parameter distribution ACT are shown. The distribution of a parameter X is either characterized by its distribution density $\phi(x)$ or its cumulative distribution $\Phi(x)$, which is simply the integral of the corresponding density. For simplicity reasons we are going to assume all distributions to be of normal type with the density function having Gaussian- or bell-shaped distribution. Thus, any involved distribution can be characterized by its mean-value $\mu$ (average) and standard deviation $\sigma$.

To compare two distributions, in this context, means to determine a characteristic value which quantifies the degree of matching between the actual and the reference distribution. For this purpose the statistical sameness value is used. It is defined as $$S \equiv \frac{1}{N_{Ref}}[\Phi_{Act}(\mu_{Ref} + k\sigma_{Ref}) - \Phi_{Act}(\mu_{Ref} - k\sigma_{Ref})]$$

Quantities referring to the actual or the reference distribution are subscripted accordingly. The normalization factor is defined by the reference distribution:

$$N_{Ref} = \Phi_{Ref}(\mu_{Ref} + k\sigma_{Ref}) - \Phi_{Ref}(\mu_{Ref} - k\sigma_{Ref})$$

The non-normalized sameness $N_{Ref} \times S$ yields the probability to find a value x of the actually considered distribution within the k $\sigma_{Ref}$ range around the mean-value $\mu_{Ref}$ of the reference distribution. In the example of FIG. 16, the factor k was set to 1 for illustration purposes, but normally k=3 is used for sameness calculations.

The criteria whether a split pattern matches a specific parameter variation are the following: 1) homogeneity of the parameter values within each split-group; and 2) distinguishable offsets between different split-groups. "Homogeneity" in this context simply means: Can a specific number of wafers be seen to form a coherent group, i.e., is the parametrical distribution of each wafer similar/same to the parametrical distribution defined by the other wafers within the same split-group? For the cross-split labeled "Split1 & Split2" in our example of FIG. 4, we should for instance ask: Is the parametrical distribution of wafer 1 similar/same to the parametrical distribution formed by wafers {2,3,4,5,6,7}? For wafer 2 we would ask, is the distribution of wafer 2 similar/same to the distribution of wafers {1,3,4,5,6,7}? For wafer 11, which belongs to split-group2, we would ask, is its distribution similar/same to that of wafers {8,9,10,12,13}? And, so forth. "Distinguishable offsets" on the other hand means: Can the parametrical distribution of one split-group be clearly separated from that of the other split-groups? In terms of our example ("Split1 & Split2"), we should therefore ask: Can the parametrical distribution defined by wafers {1,2,3,4,5,6,7} (i.e., split-group1) be separated from the distribution of wafers {8,9,10,11,12,13} (i.e., split-group2), or from that of wafers {14,15,16,17,18,19} (i.e. split-group3), etc.? The better both criteria are met; the better is the matching between parameter- and split pattern.

The notion "homogeneity" within the context of this disclosure is quantified as follows:

Based on the assumption/approximation that all encountered distributions are of normal-type, the sameness S can be written as a function of five parameters $$S = S(\mu_{Act}, \sigma_{Act}, \mu_{Ref}, \sigma_{Ref}, k)$$

or $$S = S(AVG(A), STD(A), AVG(R), STD(R), k)$$

where AVG(X) and STD(X) designate the average and standard deviation of a set of wafers for a specific parameter (X=A or R, where A=actual and R=reference). With the following additional definitions:

w: specific wafer-index, i.e. $w \in \{1, \ldots, N\}$;
N: maximum wafer-index, e.g. N=25 (for a 25 wafer lot);
$A(w) \equiv \{w\}$: set containing wafer-index w;
$SG(w) \equiv \{w_1, \ldots, w_{n(w)}\}$: set of all wafer-indices that belong to the split-group which includes the wafer with index w;
$n(w) \equiv |SG(w)|$: cardinality of the set SG(w), i.e. number of wafers included in the split-group containing wafer w;
$R(w) \equiv SG(w) \setminus A(w)$: set SG(w) without A(w);

we are able to introduce $$P_{hom}(w) \equiv \begin{cases} 1, & \text{if } n(w) = 1 \\ S(AVG(A(w)), STD(A(w)), AVG(R(w)), STD(R(w)), 3), & \text{if } n(w) > 1 \end{cases}$$

and $$P_{hom}^{total} \equiv \frac{1}{N} \sum_{w=1}^{N} P_{hom}(w)$$

These definitions operationalize the term "homogeneity" according to what has been previously described. For each wafer w its "homogeneity-contribution" $P_{hom}(w)$ is determined by calculating the sameness value of its parametrical distribution with respect to the corresponding distribution found in the remaining split-group. If there is only one wafer included in the split-group (i.e., n(w)=1), $P_{hom}$(w) is set to 1. The symbol '$P_{hom}$' has been chosen to indicate that this value can be interpreted as a probability that wafer w does not disturb the homogeneity of its own split-group SG(w).

The necessary sameness calculations are done with k=3. Every wafer contributes with the same statistical weight to the total split-group homogeneity-assessment $P_{hom}^{total}$. That is the reason why this value has been defined as the simple average of all individual values $P_{hom}$(w). $P_{hom}^{total}$ therefore assesses the overall homogeneity over all split-groups including all wafers.

In order to operationalize the second criterion, i.e., the split-group offset assessment, we need the following definitions:

$N_{SG}$: number of split-groups;
i, j: split-group indices;
AVG(i): average of split-group i:
STD(i): standard deviation of split-group i:
S(i, j)≡S(AVG(i),STD(i),AVG(j),STD(j), 3) sameness of split-group i with respect to split-group j (k=3);

With this we define $$P_{off}(i, j) \equiv 1 - \frac{1}{2}(S(i, j) + S(j, i))$$

and $$P_{off}^{total} \equiv \left(\frac{N_{SG}(N_{SG}-1)}{2}\right)^{-1} \sum_{i=1}^{N_{SG}-1} \sum_{j=i+1}^{N_{SG}} P_{off}(i, j)$$

The quantity $P_{off}$(i, j) measures the separability of split-group i from split-group j. In contrast to $P_{hom}$(w), the definition of $P_{off}$(i, j) has been made symmetric, including the term (S(i, j)+S(j, i))/2, because this way each split-group simultaneously serves in every $P_{off}$(i, j) calculation as actual and as reference distribution, and none of the split-groups is given preference over the other.

The characteristic values for the separability of the split-groups have been denoted $P_{off}$ and $P_{off}^{total}$ in order to indicate that they, too, may be interpreted as a sort of probabilities. The term (S(i, j)+S(j, i))/2 can be taken as the probability that split-group i is same to split-group j. Its complement 1−(S(i, j)+S(j, i))/2 can therefore be seen as the probability that split-group i is different from split-group j. $P_{off}^{total}$ then calculates the average of all individual offset probabilities $P_{off}$(i, j).

In the previous sections, characteristic values (probabilities) have been defined which assess two important, but subordinate aspects necessary for the split pattern identification (i.e., the split-groups' homogeneity and their offsets). Since there are many different split and cross-split patterns that usually have to be compared to a parametric signature, one obtains a great number of different $P_{off}^{total}$ and $P_{off}^{total}$ values (one pair for every parameter split combination). These must be sorted in order to be able to pick the best fitting pattern. For this purpose, we need to combine these subordinate characteristic values into a single split identification score value (split id score), which can then be used to select a certain parameter split pair.

In the context of this disclosure, combining $P_{hom}^{total}$ and $P_{off}^{total}$ into just one single split id score is done employing very elementary fuzzy logic principles, since the classical logical functions "AND" and "OR" are not suited to solve this problem. Following classical Boolean logic, one can state that a given parametric variation reflects a specific split pattern the better, the less disturbed the homogeneity within "AND" the more distinct are the offsets between its split-groups. However, the values introduced to characterize the degree of homogeneity or the split-group offsets are not of binary type (i.e. "true" or "false", "yes" or "no", 1 or 0 etc.). They can take all values out of the range from 0 to 1. This corresponds to an interpretation as "more" or "less" rather than "yes" or "no". In classical Boolean logic, however, only true binary-type values can be subjected to functions such as "AND", "OR", etc. That is the reason why fuzzy logic has to be employed in order to combine the different subordinate values.

In the theory of fuzzy sets, the logical values "true" and "false" ("yes" and "no"), which apply to any given logical statement, are replaced by the so-called membership functions p(x). Where in classical Boolean logic the element x is either a member of the set A or not $(x \in A)$ "=" true or $(x \notin A)$ "=" false $\Rightarrow A(x)=1$ or $A(x)=0$ is the degree of membership in fuzzy logic by nature "fuzzy". The membership function quantifies this degree of membership:

$A(x)=p(x)$

When the membership function is normalized, i.e. $0 \leq p(x) \leq 1$, it can be interpreted as the probability that the element belongs to the set.

For the purposes of the disclosed method, the fuzzy equivalent of a classical "AND" is needed: That is, "Are all values within the split-groups evenly (homogeneously) distributed?" AND "Are all offsets between the split-groups clearly distinguishable?"

Fuzzy theory provides different operators which generalize classical logical functions. For the disclosed method a simplified fuzzy operator corresponding to the classical logical "AND" is being used. Derived from the so-called gamma operator, it reads as follows:

$$p(x) = \prod_{i=1}^{m} p_i(x)$$

x: element of a (classical) base-set;
p(x): overall (normalized) membership-function $0 \leq p(x) \leq 1$;
$p_i$(x): (normalized) membership-function i $0 \leq p_i(x) \leq 1$;

This equation can also be identified as the classical expression for the calculation of the joint probability of m independent events, when the probability for each event i is given by $p_i$. The split id value for every split and/or cross-split s is therefore calculated by $P_{id}(s) = P_{hom}^{total}(s) \times P_{off}^{total}(s)$ These $P_{id}(s)$ are listed as score values in columns 2-7 of FIG. 13. For every parameter the maximum of its split id scores $P_{id}^{max}$ is determined and listed in column 8 of FIG. 13 and in column 4 of FIG. 15.

$$P_{id}^{max} = P_{id}(\hat{s}) \equiv \max_{s}\{P_{id}(s)\}$$

The determination of $P_{id}^{max}$ alone—as has been pointed out earlier—is not yet sufficient to finally rank the identified parameter split pairs. To achieve this goal, significance values of all best fitting parameter split pairs have to be determined in addition to the maximum split id scores calculated so far. The significance value (or simply significance) was introduced as the ratio of the maximum split-group offset relative to the spec width. In the following section this is put more formally:

Let us assume we are presently considering the parameter with the index v. Following the previously discussed methodology we may have determined $P_{hom}^{total}$ and $P_{off}^{total}$ for all splits/cross-splits s and finally found the split/cross-split $\hat{s}$ with the highest $P_{id}^{max}$ value. This split indexed $\hat{s}$ may now possess $\hat{N}_{SG}$ different split-groups.

We define:

$$MAX(\hat{s}) \equiv \max_{i}\{AVG(i)\}$$

$$MIN(\hat{s}) \equiv \min_{i}\{AVG(i)\}$$

where $$i \in \{1, \ldots, \hat{N}_{SG}\}$$

AVG(i) designates the average of parameter v with respect to split-group i. We assume that split $\hat{s}$ consists of $\hat{N}_{SG}$ split-groups, so that $i \in \{1, \ldots, \hat{N}_{SG}\}$. MAX($\hat{s}$) and MIN($\hat{s}$) are then the group-maximum and -minimum obtained for split $\hat{s}$. The span of these two values is then to be compared with the spec width. It is therefore introduced:

$$NSPCH(v) = \min\{(USL(v)-TAR(v)), (TAR(v)-LSL(v))\}$$

USL(v) and LSL(v) designate the upper and lower spec limit, TAR(v) the target value of parameter v. NSPCH(v), as the narrow spec-half, then selects the minimum of both sides of the spec. The significance of split/cross-split $\hat{s}$ with respect to parameter v is then defined as:

$$SGN(\hat{s}, v) \equiv \frac{MAX(\hat{s}) - MIN(\hat{s})}{2 \times NSPCH(v)}$$

This definition of the significance value becomes necessary, because parameters can be asymmetric in their specifications. It can be stated that for asymmetric limits the relevant range for parametric variations is generally given by the "narrow" spec-side. So that SGN($\hat{s}$,v) has been defined dividing the split-span by 2×NSPCH(v) and not the full spec-width, i.e. USL(v)−LSL(v). For symmetrical specs there is no difference, i.e., 2×NSPCH(v)=USL(v)−LSL(v).

The significance values of the best fitting parameter split pairs for our example (see the split matrix in FIG. 4 and the parameter variations in FIGS. 5 to 12) have been determined according to the formula for SGN($\hat{s}$,v) and are given in column 10 of the table in FIG. 13 and in column 5 of the table in FIG. 15.

To obtain the final overall score value, we need to combine the maximum split id score for every parameter $P_{id}^{max}(v) = P_{id}(\hat{s},v)$ with the corresponding significance value SGN($\hat{s}$,v). Since the co-domain of the significance is [0,+∞[, we have to normalize it in order to obtain $P_{sig}$ (with $0 \leq P_{sig} \leq 1$), a value which (again) is going to be interpreted as a sort of probability. This probability is then used—employing the same fuzzy concept underlying the determination of $P_{id}(s)$—to combine it with the $P_{id}^{max}$ value to eventually yield the overall score value. $P_{sig}$ is determined by:

$$P_{sig}(\hat{s}, v) \equiv 1 - \exp\left\{-\frac{SGN(\hat{s}, v)}{f_{sig}}\right\}$$

As long as the a split significance is low, $P_{sig}(\hat{s},v)$ varies linearly with SGN($\hat{s}$,v). For large split significances, however, it levels off and approaches unity. This reflects the logical interpretation that, if a given split variation exceeds a certain limit (defined by the significance-fraction $f_{sig}$), it simply becomes significant (i.e., $P_{sig}(\hat{s},v) \rightarrow 1$), no matter if it exceeds $f_{sig}$ by a factor of 10, 100 or even 1000.

The parameter $f_{sig}$ is called the "significance fraction", because it defines the fraction of the spec range—actually 2×NSPCH(v), to be precise—from that on a certain split variation really starts getting relevant. For our purposes $f_{sig}$=0.25 is used.

Once $P_{sig}(\hat{s},v)$ has been calculated, the overall score value $P_{osv}(\hat{s},v)$ for split $\hat{s}$ and parameter v is defined by $$P_{OSV}(\hat{s}, v) = P_{id}^{max}(v) \times P_{sig}(\hat{s}, v)$$

$$= P_{id}(\hat{s}, v) \times P_{sig}(\hat{s}, v)$$

For our example, $P_{osv}(\hat{s},v)$ is given as percentage value in column 11 of FIG. 13 and in column 6 of FIG. 15. The table in FIG. 15 has then been sorted according to these overall score values in descending order. Only parameter split pairs with large overall score values ($P_{osv}(\hat{s},v) \rightarrow 1$ or 100% respectively) exhibit a high probability that the distribution of parameter v actually reflects the pattern of the best-fitting split/cross-split $\hat{s}$ on the one hand, and that the parametric variation due to this split/cross-split $\hat{s}$ is really significant with respect to the specification of parameter v on the other hand.

What is claimed is:

1. A method of adjusting process variables in a processing flow that comprises a sequence of processing steps, the method comprising:
   testing processed samples to determine sample parameters of the tested samples;
   analyzing said sample parameters in relation to the process variables applied in the processing steps to determine the impact of the process variables on the sample parameters;
   modifying the process variables in an attempt to change the sample parameters towards predetermined target values; and
   repeating the sequence of processing steps with the modified process variables;

wherein the analyzing step includes, for given samples:
automated matching between patterns of process variables applied for said samples and patterns of corresponding sample data sets of parameters determined from said samples;
quantifying the degree of match in terms of score values associated with patterns of process variables; and
determining the significance of said score values in terms of significance values calculated based on the deviation of the parameters in the sample data sets from said predetermined target values.

2. The method of claim 1, wherein the processing flow is a semiconductor technology development flow and the processing steps involve application of different patterns of processing variables to different samples in a lot of semiconductor wafers.

3. The method of claim 2, wherein the patterns of processing variables comprise process splits in which different values of a single process variable, or of a combination of process variables, are applied to different samples in a lot.

4. The method of claim 3, wherein the patterns of processing variables comprise virtual cross-splits derived from said process splits by combining the application of process variables from different process splits to each sample of a lot.

5. The method of claim 1, wherein the degree of match between patterns of process variables and sample data sets of parameters determined from said samples is quantified by:
determining data subsets within said sample data sets of parameters;
calculating first subordinate score values which reflect the degree of homogeneity within said data subsets;
calculating second subordinate score values which reflect the degree of deviation between different said data subsets; and
combining said first and second subordinate score values into single super-ordinate score values applying principles of fuzzy logic.

6. The method according to claim 5, wherein said significance values are determined by:
determining sample parameter group-ranges within the sample data sets of parameters;
calculating ratios of said sample parameter group-ranges to predetermined specification ranges; and
normalizing the calculated ratios to obtain normalized significance score values.

7. The method according to claim 6, wherein maximum super-ordinate score values are determined from said super-ordinate score values and said normalized significance score values applying principles of fuzzy logic.

8. The method according to claim 7, wherein matched patterns of process variables and patterns of sample data parameters are ranked according to said overall score value.

9. The method according to claim 1, wherein said significance values are determined by:
determining sample parameter group-ranges within the sample data sets of parameters;
calculating ratios of said sample parameter group-ranges to predetermined specification ranges; and
normalizing the calculated ratios to obtain normalized significance score values.

10. The method according to claim 9, wherein maximum super-ordinate score values are determined from said super-ordinate score values and said normalized significance score values applying principles of fuzzy logic.

11. The method according to claim 10, wherein matched patterns of process variables and patterns of sample data parameters are ranked according to said overall score value.

* * * * *